(12) United States Patent
Geissler et al.

(10) Patent No.: US 11,219,979 B2
(45) Date of Patent: Jan. 11, 2022

(54) TOOL POSITIONING

(71) Applicant: Mo-Sys Engineering Limited, London (GB)

(72) Inventors: Michael Paul Alexander Geissler, London (GB); Martin Peter Parsley, London (GB)

(73) Assignee: Mo-Sys Engineering Limited, London (GB)

( * ) Notice: Subject to any disclaimer, the term of this patent is extended or adjusted under 35 U.S.C. 154(b) by 55 days.

(21) Appl. No.: 16/764,236

(22) PCT Filed: Nov. 7, 2018

(86) PCT No.: PCT/GB2018/053233
§ 371 (c)(1),
(2) Date: May 14, 2020

(87) PCT Pub. No.: WO2019/097208
PCT Pub. Date: May 23, 2019

(65) Prior Publication Data
US 2020/0276682 A1 Sep. 3, 2020

(30) Foreign Application Priority Data

Nov. 15, 2017 (GB) ..................................... 1718848

(51) Int. Cl.
*B23Q 17/24* (2006.01)
*G06T 7/73* (2017.01)

(52) U.S. Cl.
CPC .............. *B23Q 17/249* (2013.01); *G06T 7/74* (2017.01); *B23Q 2717/00* (2013.01); *G06T 2207/30164* (2013.01); *G06T 2207/30204* (2013.01)

(58) Field of Classification Search
CPC .. B23Q 17/249; B23Q 17/22; B23Q 17/2233; B23Q 2717/00; G06T 2207/30204;
(Continued)

(56) References Cited

U.S. PATENT DOCUMENTS 8,848,052 B2 * 9/2014 Fuchs .................. B25H 1/0085
348/142
2007/0248283 A1 10/2007 Mack et al.
(Continued)

FOREIGN PATENT DOCUMENTS

EP    2916189 A1   9/2015
EP    3054404 A1   8/2016
(Continued)

OTHER PUBLICATIONS

International Search Report and Written Opinion from PCT Application No. PCT/GB2018/053233, dated Apr. 10, 2019, pp. 1-13.
(Continued)

*Primary Examiner* — Ian L Lemieux
(74) *Attorney, Agent, or Firm* — Haynes and Boone, LLP

(57) ABSTRACT

A method for monitoring a work process in which a workpiece is worked on by a tool, the method comprising: providing an irregular pattern of indicia remote from the workpiece and the tool; imaging the indicia by an imaging device carried by the workpiece and thereby estimating the location of the workpiece with respect to the indicia; imaging the indicia by an imaging device carried by the tool and thereby estimating the location of the tool with respect to the indicia; and correlating the location of the workpiece and the tool to estimate an operation performed by the tool on the workpiece.

14 Claims, 2 Drawing Sheets

(58) Field of Classification Search
CPC . G06T 2207/30244; G06T 2207/30164; G06T 2207/30208; G06T 7/74; G06F 3/0425; G06K 2009/3225
See application file for complete search history.

(56) References Cited

U.S. PATENT DOCUMENTS

| | | | |
|---|---|---|---|
| 2008/0250625 A1* | 10/2008 | Slettemoen | G01B 21/045 |
| | | | 29/407.04 |
| 2015/0094836 A1 | 4/2015 | Rivers et al. | |
| 2015/0253766 A1* | 9/2015 | Pettersson | G05B 19/41805 |
| | | | 700/168 |
| 2016/0005185 A1* | 1/2016 | Geissler | G06T 7/579 |
| | | | 348/47 |
| 2016/0078706 A1 | 3/2016 | Pawlik et al. | |
| 2016/0224927 A1* | 8/2016 | Pettersson | G06Q 50/08 |
| 2017/0228891 A1 | 8/2017 | Ward | |
| 2017/0249745 A1* | 8/2017 | Fiala | A63F 13/25 |
| 2018/0130226 A1* | 5/2018 | Meess | G09B 19/24 |

FOREIGN PATENT DOCUMENTS

| | | |
|---|---|---|
| EP | 2962284 B1 | 6/2018 |
| WO | 2015176163 A1 | 11/2015 |

OTHER PUBLICATIONS

Great Britain Search Report from GB1718848.3, dated Aug. 16, 2019, pp. 1-4.

* cited by examiner

TOOL POSITIONING

RELATED APPLICATIONS

This application is a 371 National Stage of International Patent Application No. PCT/GB2018/053233 filed Nov. 7, 2018, entitled "TOOL POSITIONING," which claims priority to British Patent Application No. 1718848.3 filed Nov. 15, 2017, entitled "TOOL POSITIONING," both of which are herein incorporated by reference in their entirety.

This invention relates to determining the positions of tools and workpieces.

In assembly operations, it is desirable to be able to track the positions of tools and workpieces. This enables an audit to be maintained of which tool was used on which workpiece. It enables data to be collected on what operations were performed on which workpiece: for example that a particular bolt was tightened to a particular torque. It enables tools to be configured automatically to suit a particular workpiece: for example to ensure that the correct torque setting is made on a nut driver when it is offered up to a nut in a particular position on a part that is being assembled.

One way to track tool position is by using radio positioning. For example, https://www.decawave.com/news/current-news/decawave-featured-2016-bosch-connected-world discloses the use of IEEE802.15.4a-compliant signals to estimate the location of tools. Radio positioning has a number of weaknesses. For example, it may be subject to interference, and it cannot typically determine the orientation of a tool unless the tool is provided with multiple radio transmitters or receivers.

It would be desirable to be able to have an improved way of determining the positions of tools and workpieces.

According to the present invention there is provided a method/apparatus as set out in the accompanying claims.

The present invention will now be described by way of example with reference to the accompanying drawings.

Figure 1:
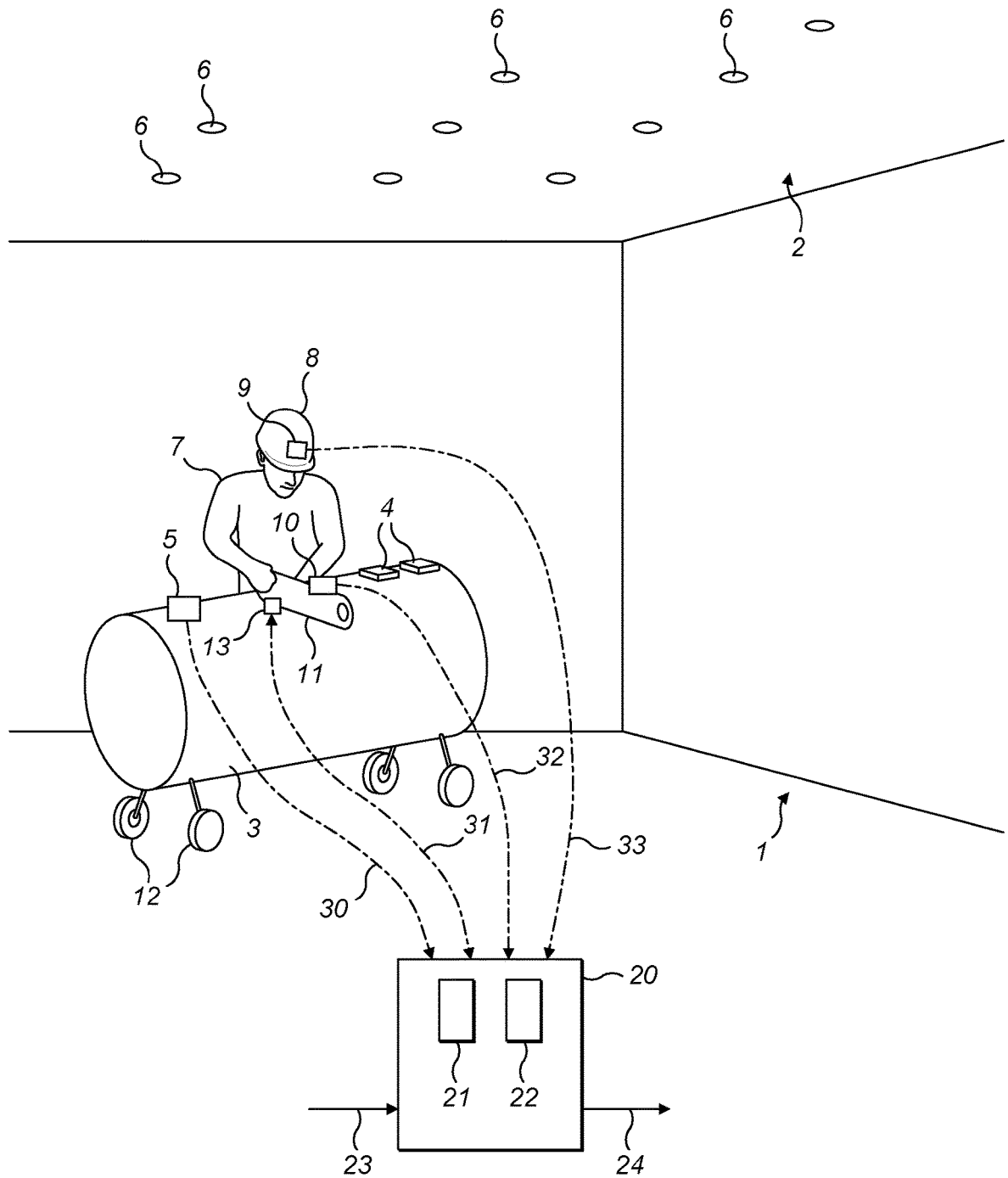
FIG. 1 shows an assembly environment.

The system of FIG. 1 comprises a workplace 1. A ceiling 2 extends over the workplace.

In the workplace an operator 7 is working on a workpiece 3. The workpiece is movable in the workplace, for example on wheels 12 or on a conveyor belt. The workpiece may be being processed in a production line. The workpiece has components 4 which are to be worked on. These may for example be nuts or bolts that are to be tightened; inserts that are to be driven home; elements that are to be fitted to the workpiece by means such as soldering, braising, welding, clipping or by adhesive; elements that are to be removed from the workpiece. The operator is to work on the components using tool 11. The nature of tool 11 will depend on the nature of the components but it may, for example, be a spanner, hammer, nut driver, drill, wrench, saw or any other appropriate tool. It may be a hand tool or a powered tool.

A positioning unit 5 is attached to the workpiece 5. The positioning unit 5 is preferably attached to the workpiece in a predetermined location and orientation, so that the position and orientation of the workpiece with respect to the positioning unit 5 is known. Alternatively, one or both of the position and orientation of the workpiece with respect to the positioning unit can be learned as the workpiece is processed: for example when it is in a reference position and/or orientation.

A positioning unit 10 is attached to the tool 11. The positioning unit 10 is preferably attached to the tool in a predetermined location and orientation, so that the position and orientation of the tool with respect to the positioning unit 10 is known. Alternatively, one or both of the position and orientation of the tool with respect to the positioning unit can be learned as the tool is moved: for example when it is in a reference position and/or orientation.

A positioning unit 9 is attached to a wearable item 8 worn by the operator 7. The wearable item could, for example be a hat or glasses. It is preferably wearable in a conventional manner on the head of the operator. The positioning unit 9 is preferably attached to the wearable item 8 in a predetermined location and orientation, so that the position and orientation of the wearable item with respect to the positioning unit 9 is known. Alternatively, one or both of the position and orientation of the wearable item with respect to the positioning unit can be learned as the wearable item is moved: for example when it is in a reference position and/or orientation.

The positioning units 5, 9, 10 feed data to a control unit 20 via data links 30, 33, 32 respectively.

The tool has a local control unit 13. It is linked to control unit 20 via data link 31. The local control unit can perform any or all of: (a) reporting to the control unit 20 on the settings of the tool (e.g. its torque or speed limits), (b) reporting to the control unit 20 on operations performed by the tool (e.g. that it has performed a tightening operation to a specific torque), and (c) receiving data from the control unit 20 commanding that a setting be applied to the tool (e.g. a torque setting or operational mode), and applying that setting to the tool.

The positioning systems 5, 9, 10 may operate as described in EP 2 962 284.

Indicia 6 are applied to objects in the workplace 1. In this example the indicia are applied to the ceiling 2 of the workplace. The indicia are preferably of an appearance that is readily distinguishable from the environment. For example, they may be of very high reflectivity (e.g. of retroreflective material) or of very low reflectivity (e.g. having a matt black surface coating), or they may be of a defined colour, for example a specific green. When the indicia are of high reflectivity, preferably each one is of a material that reflects preferentially in a direction orthogonal to its major plane, as may be the case with dedicated retroreflective materials. The indicia are preferably flat: for example, they may be in the form of laminar stickers applied to one or more surfaces. This can make them easy to apply in the environment. The indicia preferably bear no surface markings (e.g. numbers or bar codes) by which each one can be distinguished from the others. This can make the task of applying the indicia in the environment easier. The indicia may all have the same outline (e.g. round or square) or they may have different outlines. The indicia are positioned in an irregular pattern. The pattern is preferably non-repeating. This may be achieved by randomly positioning the indicia in the environment. Positioning the indicia in an irregular pattern can make the task of applying the indicia easier and also facilitates locating objects in the environment, as will be described below. The indicia may all be of the same size, which may help their range to be determined as will be described further below, or of different sizes. In summary, in a preferred arrangement the indicia are provided by identical retroreflective stickers which are applied to the environment in an irregular or random pattern.

Figure 2:
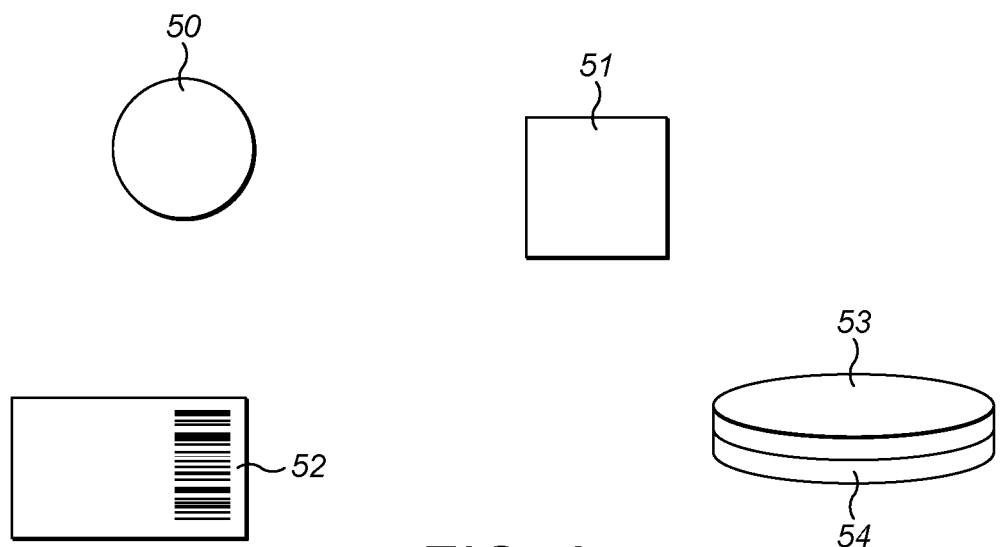
FIG. 2 shows examples of indicia.

FIG. 2 shows examples of indicia. The indicia could be round (see 50), square (see 51) or of other shapes. The indicia could bear markings such as barcode 52 which allow any of the indicia to be distinguished uniquely from the others, or they may bear no such markings. Conveniently the indicia take the form of stickers having an upper surface 53 of a predetermined colour and/or reflectivity and a lower adhesive surface 54 by means of which they may be adhered to the environment.

The indicia may be located on upwards-facing, downwards-facing or sideways-facing surfaces of the environment. It is preferred that at least some of the indicia are located on downwards-facing surfaces, e.g. ceiling 2. Such a downward-facing surface may be above the place where the workpiece 3 is worked on. Visibility of indicia located above a detector 5, 9, 10 is typically better than of indicia located sideways of or below the detector because it is in general less likely to be obstructed by other objects or people.

As discussed above, the workpiece 3, the tool 11 and the operator 7 each carry a respective positioning device 5, 10, 9 respectively. Each positioning device comprises an imaging device such as a camera. The camera of each positioning unit is configured to capture images in a direction generally away from the object that is carrying it. Each camera is preferably directed upwards. Each camera is preferably detected so as to be able to image at least some of the indicia 6 when the object carrying the camera is in its intended orientation in the workplace. Images, e.g. video frames, gathered by the camera are processed to estimate the location of the respective positioning unit. From that location the location of the object carrying the respective positioning unit can be inferred.

The camera of a positioning device and the indicia 6 enable the location of the positioning device to be estimated in the workplace. The manner in which this is achieved will now be described with reference to FIG. 3.

Figure 3:
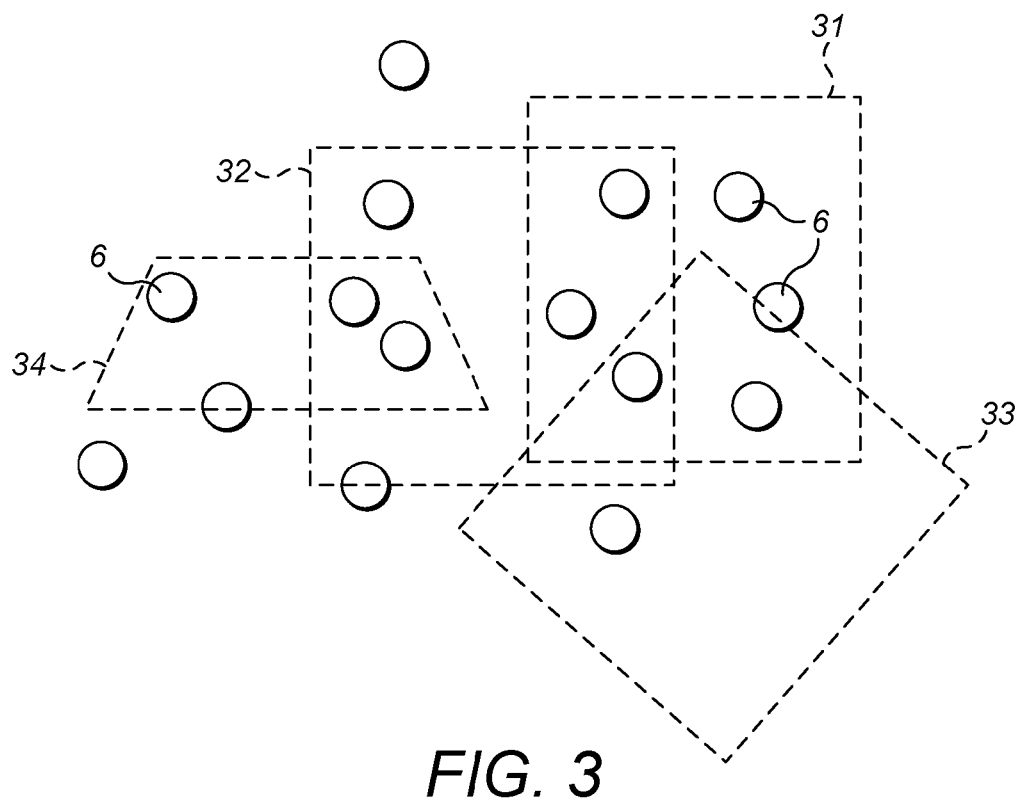
FIG. 3 shows a pattern of indicia in an environment and frames captured by an imaging device such as a camera.

The camera of a positioning unit 5, 9, 10 captures a series of frames. The direction in which the camera of the positioning unit is pointing when it captures a frame depends on how the object carrying the respective positioning unit is positioned at that time. FIG. 3 shows indicia 6 in an irregular pattern, and a set of outlines 31, 32, 33, 34 indicating the boundaries of frames captured by the camera of a positioning unit. The positioning unit comprises a processor and a memory. The memory stores in non-transitory form a set of instructions executable by the processor to perform its functions. The processor receives the successive frames captured by the camera of the positioning unit. The processor analyses each frame to detect the locations of the indicia 6 as represented in the frame. The indicia may be detected through their characteristic brightness, shape, colour or a combination of those factors. For example, in the case of retroreflective indicia the indicia may be indicated by particularly bright pixel groups in the image.

By comparing the position and layout of the indicia as detected in successive frames the processor can (a) build up a map of the pattern or constellation formed by the indicia and (b) infer the motion of the positioning unit between frames. For illustration, suppose at a first time the camera of a positioning unit captures the image indicated at 31. The processor identifies the indicia 6 in that image. The indicia can be considered to lie on vectors extending from the camera and intersecting the locations of the indicia as represented in image 31. At this stage the ranges of the indicia from the camera are not known. At a second time the camera captures the image indicated at 32. Some indicia are common to images 31 and 32. Because the indicia are positioned irregularly it can be assumed that the relative positions of the indicia found in each frame are unique in the field of indicia. By comparing the positions of the images of indicia in successive frames the processor can build up a record of where in a three-dimensional space the actual indicia are. For example, because three indicia 6 appear in a common spatial relationship in frames 31 and 32 it can be inferred that the camera has undergone translation between those images without rotation or tilting. Comparison of the positions of the indicia in frame 33 with those in the other frames 31, 32 whose fields of view overlap frame 33 permit the processor to infer that the positioning unit was rotated about its primary axis before frame 33 was captured. Comparison of the positions of the indicia in frame 34 with those in the other frames (e.g. 32) whose fields of view overlap frame 34 permit the processor to infer that the positioning unit was tilted before frame 33 was captured. Similarly, motion of the positioning unit towards or away from the field of indicia can be detected through scaling of the detected positions of the indicia between successive frames.

The accuracy of this positioning method can be improved if the camera of the positioning unit has a relatively wide field of view and/or if the density of the field of indicia is such that numerous indicia can be expected to be captured in each frame. That makes it less likely that there will be positional ambiguity due to multiple indicia accidentally having a similar positional relationship and therefore being confused as between images. That also reduces the influence of other objects that might appear similar to indicia (e.g. lights) and that might move. In solving for the position of the camera, the processor searches for the best fit to the collected data, but that fit might not be perfect: for example it might not fit to a mobile light that has been mistakenly identified as one of the indicia.

The position of indicia in an image indicates the direction of those indicia with respect to the camera of the positioning unit but not necessarily their distance from the camera. It may be possible for the processor of the positioning unit to infer the distance to indicia from the size with which they appear in the image. Alternatively, or in addition, the distance to indicia may be inferred from the changes in the imaged positions of indicia as between frames. The processor solves a multi-variable problem in which the relative directions from the camera of the positioning unit to the indicia in successive frames are known. The processor determines a map of the indicia that provides the best fit to the information collected in successive frames as to the directions of indicia from the camera. Having formed the map, it estimates the position of the camera with reference to that map by identifying a position and orientation from which a view of the mapped indicia would be expected to best match the indicia as identified in the latest image from the camera. This problem can be simplified if it is known with greater confidence that the same one of the indicia as is represented at a location in a first frame is also represented at a location in a second frame. This relationship can be achieved by one or both of: (i) the rate at which the frames are captured being sufficiently high that one or more indicia will typically appear in successive frames, and can therefore be tracked by the processor; and (ii) the processor searching for common spatial patterns among the indicia as imaged, which indicate that the same set of indicia have been imaged in different frames.

It would be possible for the processor to be pre-programmed with the locations of the indicia, but it has been found that with a constellation of indicia of suitable density this is not necessary because the processor can learn their locations satisfactorily. It may, however, assist in permitting a translational and/or rotational offset between a position determined by the positioning unit and a reference location/orientation in the studio to be determined. Alternatively, that can be determined by placing the positioning unit at a known location and/or orientation in the studio, and then tracking its subsequent motions.

It would be possible for the indicia to be provided with distinctive markers, to help the processor distinguish the images of different indicia from each other. Those could for example be numbers or bar codes, or the shape or colour of different indicia may differ so that they can be differentiated.

Using the process described above, the processor detects and tracks motion of the camera.

The positioning systems 5, 9, 10 provide outputs indicating the locations of the workpiece, the tool and the operator over time. These are provided to controller 20. The controller comprises a processor 21 and a memory 22. The memory stores in a non-transitory way code that is executable by the processor to cause the controller to perform the functions described of it herein.

Data defining a set of intended operations is received by the controller 20 at 23. This operation definition data represents parameters of operations that are to be performed by the operator using the tool 10. For example, the operation definition data may indicate that a bolt at a specific location on the workpiece is to be tightened to a specific torque. The operation definition data may also define the locations of components 4 on the workpiece 3 with respect to a reference location and orientation such as the location and orientation at and in which the location detector 5 is positioned.

The tool 11 may comprise a handle and a working head. The positioning device 10 may be attached to the handle of the tool. It may be positionally offset from the head. Estimating the location of the head of the tool based on the location of the positioning device 10 may employ knowledge of (a) the orientation of the device 10 and therefore the handle, and (b) the distance between the device 10 and the head. Since the positioning device determines its location optically from the constellation 6, the orientation of the device 10 can be known. The distance between the device 10 and the head may be stored in the device 10 and/or in the control unit 20 to permit either to estimate the location of the head itself.

When work is taking place, the system operates as follows.

The location devices 5, 9, 10 are continually or intermittently tracking the locations in the workplace 1 of the objects carrying them. They do this by reference to the indicia 6, as described above. The locations of the objects are passed to the controller 20.

In one mode of operation, the controller 20 operates to store an audit record of the operations that have been performed. Because the location of the tool 11 and the workpiece 3 are known with reference to the workplace 1, their relative locations can be determined. This, together with the relevant operation definition data, allows the controller 20 to estimate which component the tool is working on. When the tool is inferred by the controller 20 to be working on a component, that information is logged by the controller 20. The controller 20 could store the entire path of the tool as it moves near the workpiece. Similarly, the position of the operator may be logged at the time of an operation being performed, or continuously/intermittently. The controller 20 could store details of operations performed by the tool. The control unit 13 of the tool could signal the controller 20 when an operation such as a tightening operation is performed, and optionally the parameters of that operation: for example the torque applied.

In another mode of operation, when the controller 20 determines that the tool is positioned at a particular component 4, it determines from the operation definition data what tool settings are required for that component, transmits the settings to the tool and the controller 13 of the tool applies the received setting. Guidance based on the operation definition data may be transmitted by the controller 20 to be displayed on a wearable headset or other display accessible to the operator 7.

The operator may be a robot manipulator or a human.

The system described above may provide a number of advantages over other systems. First, it can allow the orientation of the tool and/or workpiece and/or operator to be determined without the use of multiple transmitters/receivers on the respective object. Second, because the locations of the objects are determined optically with respect to a common constellation of indicia 6 the relative locations of the objects might be reliably determine, and without risk of radio interference.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for monitoring a work process in which a workpiece is worked on by a tool, the method comprising:
   providing an irregular pattern of indicia remote from the workpiece and the tool;
   imaging the indicia by an imaging device carried by the workpiece and thereby estimating the location of the workpiece with respect to the indicia;
   imaging the indicia by an imaging device carried by the tool and thereby estimating the location of the tool with respect to the indicia; and
   correlating the location of the workpiece and the tool to estimate an operation performed by the tool on the workpiece.

2. A method as claimed in claim 1, wherein the tool is carried by an operator and the method comprises:
   imaging the indicia by an imaging device carried by the operator and thereby estimating the location of the operator with respect to the indicia.

3. A method as claimed in claim 2, wherein the imaging device carried by the operator is attached to an item of headgear worn by the operator.

4. A method as claimed in claim 1, wherein the indicia are located above the workpiece.

5. A method as claimed in claim 1, wherein the step of estimating the location of the workpiece comprises:
   receiving by means of the imaging device carried by the workpiece a series of images of the environment captured by that imaging device;
   detecting in the images captured by that imaging device the representation of each of a plurality of indicia located in the environment; and forming the said estimate of the position of the workpiece by comparing the locations of representations of the indicia in images captured at different times.

6. A method as claimed in claim 1, wherein the step of estimating the location of the tool comprises:
   receiving by means of the imaging device carried by the tool a series of images of the environment captured by that imaging device;
   detecting in the images captured by that imaging device the representation of each of a plurality of indicia located in the environment; and
   forming the said estimate of the position of the tool by comparing the locations of representations of the indicia in images captured at different times.

7. A method as claimed in claim 1, wherein the step of estimating the location of the operator comprises:
   receiving by means of the imaging device carried by the operator a series of images of the environment captured by that imaging device;
   detecting in the images captured by that imaging device the representation of each of a plurality of indicia located in the environment; and
   forming the said estimate of the position of the operator by comparing the locations of representations of the indicia in images captured at different times.

8. A method as claimed in claim 5, comprising detecting the representation of each of the indicia in the image as a relatively high brightness region of the image.

9. A method as claimed in claim 1, wherein the indicia are retroreflective.

10. A method as claimed in claim 1, wherein the indicia are substantially identical.

11. A method as claimed in claim 1, wherein the indicia are located on a downwards-facing surface of the environment.

12. An apparatus for monitoring a work process in which a workpiece is worked on by a tool, the apparatus comprising:
   an irregular pattern of indicia remote from the workpiece and the tool;
   an imaging device carried by the workpiece configured to image an irregular pattern of indicia remote from the workpiece and the tool, wherein the location of the workpiece with respect to the indicia is estimated;
   an imaging device carried by the tool to image the irregular pattern of indicia, wherein the location of the tool with respect to the indicia is estimated; and
   a controller configured to correlate the location of the workpiece and the tool to estimate an operation performed by the tool on the workpiece.

13. A method as claimed in claim 6, comprising detecting the representation of each of the indicia in the image as a relatively high brightness region of the image.

14. A method as claimed in claim 7, comprising detecting the representation of each of the indicia in the image as a relatively high brightness region of the image.

* * * * *